United States Patent
Levine et al.

(10) Patent No.: US 11,106,801 B1
(45) Date of Patent: Aug. 31, 2021

(54) UTILIZING ORCHESTRATION AND AUGMENTED VULNERABILITY TRIAGE FOR SOFTWARE SECURITY TESTING

(71) Applicant: Accenture Global Solutions Limited, Dublin (IE)

(72) Inventors: Richard Levine, Marston Mills, MA (US); Karel Kohout, Prague (CZ); Dalton Harris, Fort Worth, TX (US); Jason Widen, Chicago, IL (US); Ganesh Devarajan, Hawthorn Woods, IL (US); Vidya Govindan, Bangalore (IN); Mário Lauande Lacroix, Toronto (CA); John Donovan Delmare, Jr., Gainesville, VA (US); Johnny Obando, Cypress, TX (US); Steven Nicholas Strupp, St. Louis, MO (US); Matt Renzi Quillosa, Cebu (PH)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/136,942

(22) Filed: Dec. 29, 2020

(30) Foreign Application Priority Data

Nov. 13, 2020 (IN) .............................. 202041049719

(51) Int. Cl.
*G06F 7/04* (2006.01)
*G06F 21/57* (2013.01)
(Continued)

(52) U.S. Cl.
CPC ............ *G06F 21/577* (2013.01); *G06F 9/451* (2018.02); *G06F 11/3688* (2013.01);
(Continued)

(58) Field of Classification Search
CPC .... G06F 21/577; G06F 9/451; G06F 11/3688; G06F 11/3692; G06F 2221/033; G06N 20/00
See application file for complete search history.

(56) References Cited

U.S. PATENT DOCUMENTS

| 9,544,327 B1 * | 1/2017 | Sharma | G06N 20/00 |
| 2014/0122396 A1 * | 5/2014 | Swaminathan | G06N 20/00 706/14 |

(Continued)

*Primary Examiner* — Hang Pan
(74) *Attorney, Agent, or Firm* — Harrity & Harrity, LLP

(57) ABSTRACT

A device may receive contextual data, computational data, experiential data, and industry data associated with software code, and may receive detected vulnerabilities data identified by a scanning model based on the software code and software code metadata of the computational data. The device may process the contextual data, the computational data, and the experiential data, with a contextual identification model, to determine a set of rules and a set of actions, and may enrich, via an enrichment model, the industry data with the experiential data to generate enriched industry data. The device may process the software code metadata, the detected vulnerabilities data, and the enriched industry data, with a correlation model, to generate analysis data, and may process the analysis data and the set of rules, with a security model, to confirm security issues associated with the software code. The device may perform one of the set of actions based on the security issues.

20 Claims, 10 Drawing Sheets

(51) Int. Cl.
*G06F 11/36* (2006.01)
*G06N 20/00* (2019.01)
*G06F 9/451* (2018.01)

(52) U.S. Cl.
CPC .......... *G06F 11/3692* (2013.01); *G06F 21/57* (2013.01); *G06N 20/00* (2019.01); *G06F 2221/033* (2013.01)

(56) References Cited

U.S. PATENT DOCUMENTS

2014/0165204 A1* 6/2014 Williams ................ H04L 63/02
 726/25
2016/0371494 A1* 12/2016 Daymont .............. G06F 21/577
2017/0171236 A1* 6/2017 Ouchn ................ H04L 63/1433
2017/0212829 A1* 7/2017 Bales .................. G06F 11/3612

* cited by examiner

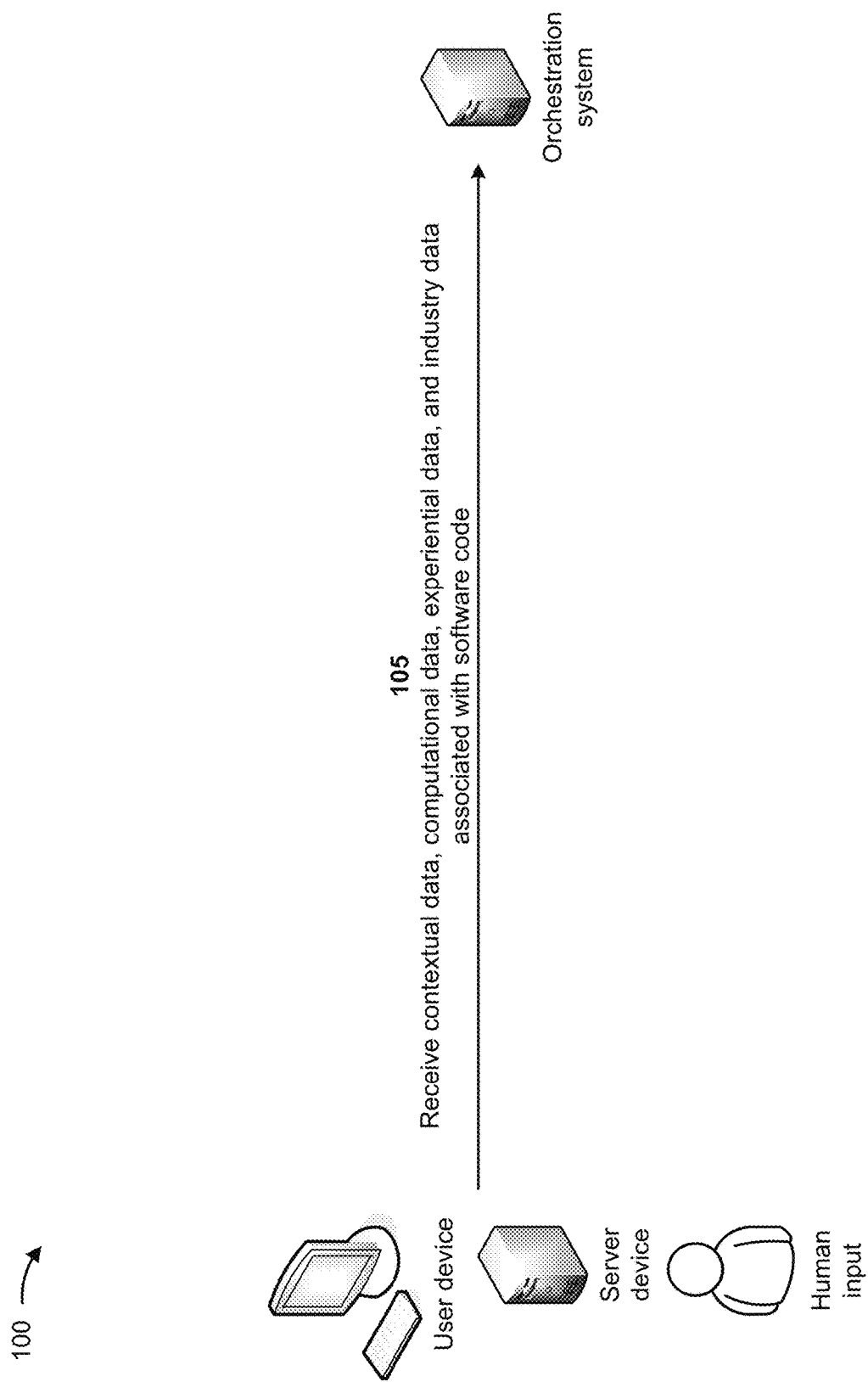

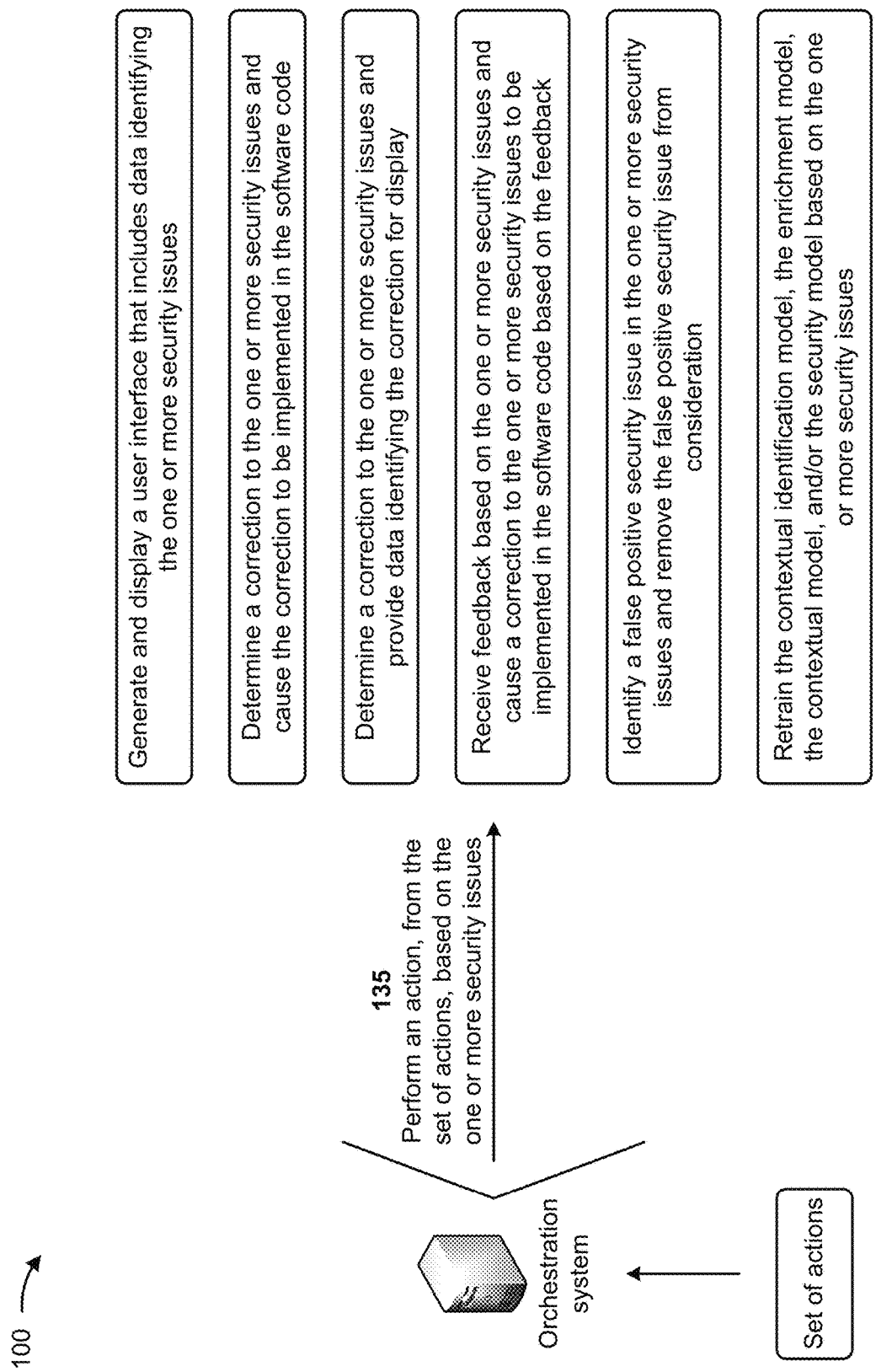

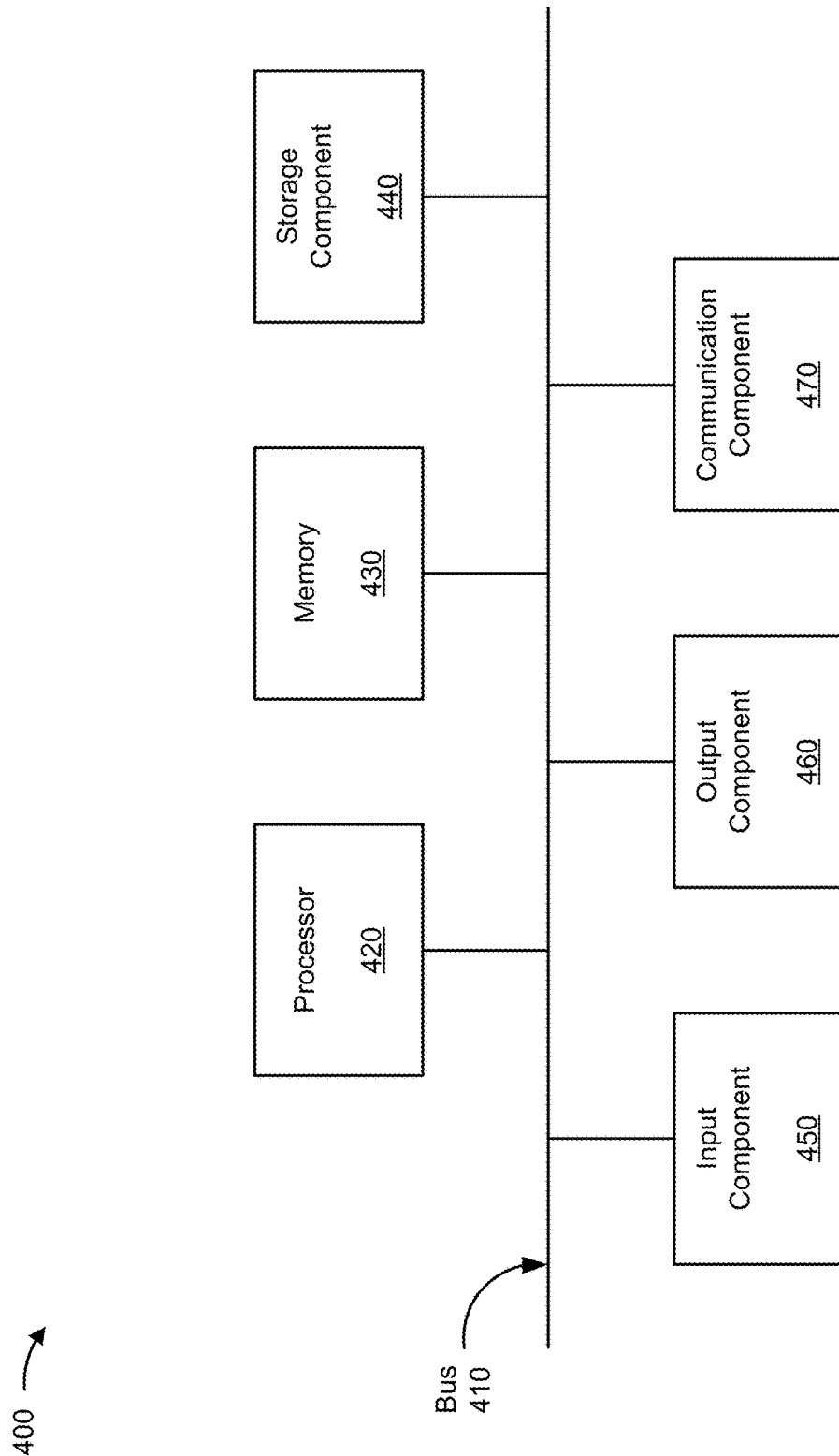

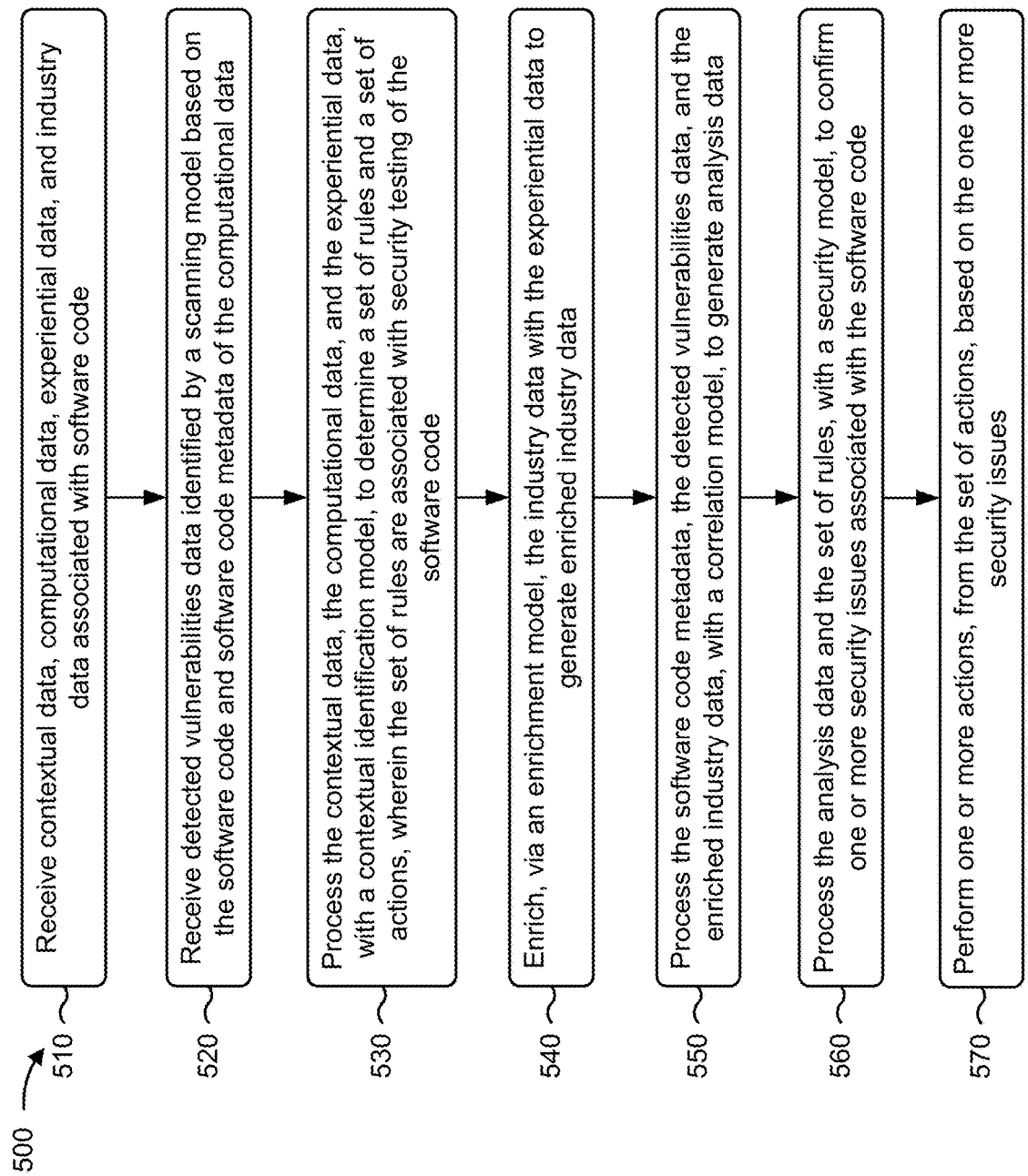

UTILIZING ORCHESTRATION AND AUGMENTED VULNERABILITY TRIAGE FOR SOFTWARE SECURITY TESTING

CROSS-REFERENCE TO RELATED APPLICATION

This application claims priority to Indian Provisional Application No. 202041049719 entitled "UTILIZING ORCHESTRATION AND AUGMENTED VULNERABILITY TRIAGE FOR SOFTWARE SECURITY TESTING," filed on Nov. 13, 2020. The entire content of which is expressly incorporated herein by reference.

BACKGROUND

Software security testing is a type of software testing that uncovers vulnerabilities, threats, risks, and/or the like in software code (e.g., an application) and prevents malicious attacks from intruders. The purpose of a software security test is to identify all possible loopholes and weaknesses of the software code, which might result in a loss of information, revenue, repute, and/or the like at the hands of employees or outsiders of an organization.

SUMMARY

In some implementations, a method includes receiving contextual data, computational data, experiential data, and industry data associated with software code, and receiving detected vulnerabilities data identified by a scanning model based on the software code and software code metadata of the computational data a. The method may include processing the contextual data, the computational data, and the experiential data, with a contextual identification model, to determine a set of rules and a set of actions, wherein the set of rules are associated with security testing of the software code. The method may include enriching, via an enrichment model, the industry data with the experiential data to generate enriched industry data, and processing the software code metadata, the detected vulnerabilities data, and the enriched industry data, with a correlation model, to generate analysis data. The method may include processing the analysis data and the set of rules, with a security model, to identify one or more security issues associated with the software code, and performing one or more actions, from the set of actions, based on the one or more security issues.

In some implementations, a device includes one or more memories, and one or more processors to receive contextual data, computational data, experiential data, and industry data associated with software code, wherein the industry data includes one or more of industrial vulnerability indexes, data identifying laws and regulations, threat and vulnerability intelligence data, or infrastructure data. The one or more processors may receive detected vulnerabilities data identified by a scanning model based on the software code and software code metadata of the computational data, and may process the contextual data, the computational data, and the experiential data, with a contextual identification model, to determine a set of rules and a set of actions, wherein the set of rules are associated with security testing of the software code. The one or more processors may enrich, via an enrichment model, the industry data with the experiential data to generate enriched industry data, and may process the software code metadata, the detected vulnerabilities data, and the enriched industry data, with a correlation model, to generate analysis data. The one or more processors may process the analysis data and the set of rules, with a security model, to identify one or more security issues associated with the software code, and may perform one or more actions, from the set of actions, based on the one or more security issues.

In some implementations, a non-transitory computer-readable medium may store a set of instructions that includes one or more instructions that, when executed by one or more processors of a device, cause the device to receive contextual data, computational data, experiential data, and industry data associated with software code, wherein the contextual data includes one or more of the software code or data identifying an infrastructure to which the software code is to be deployed, and wherein the experiential data includes data provided by a plurality of experts associated with security testing of the software code. The one or more instructions may cause the device to receive detected vulnerabilities data identified by a scanning model based on the software code and software code metadata of the computational data, and process the contextual data, the computational data, and the experiential data, with a contextual identification model, to determine a set of rules and a set of actions, wherein the set of rules are associated with security testing of the software code. The one or more instructions may cause the device to enrich, via an enrichment model, the industry data with the experiential data to generate enriched industry data, and process the software code metadata, the detected vulnerabilities data, and the enriched industry data, with a correlation model, to generate analysis data. The one or more instructions may cause the device to process the analysis data and the set of rules, with a security model, to confirm one or more security issues associated with the software code, and perform one or more actions, from the set of actions, based on the one or more security issues.

BRIEF DESCRIPTION OF THE DRAWINGS

FIGS. 1A-1F are diagrams of an example implementation described herein.

FIG. 4 is a diagram of example components of one or more devices of FIG. 3.

FIG. 5 is a flowchart of an example process for utilizing orchestration and augmented vulnerability triage for software security testing.

DETAILED DESCRIPTION

Figure 1B:
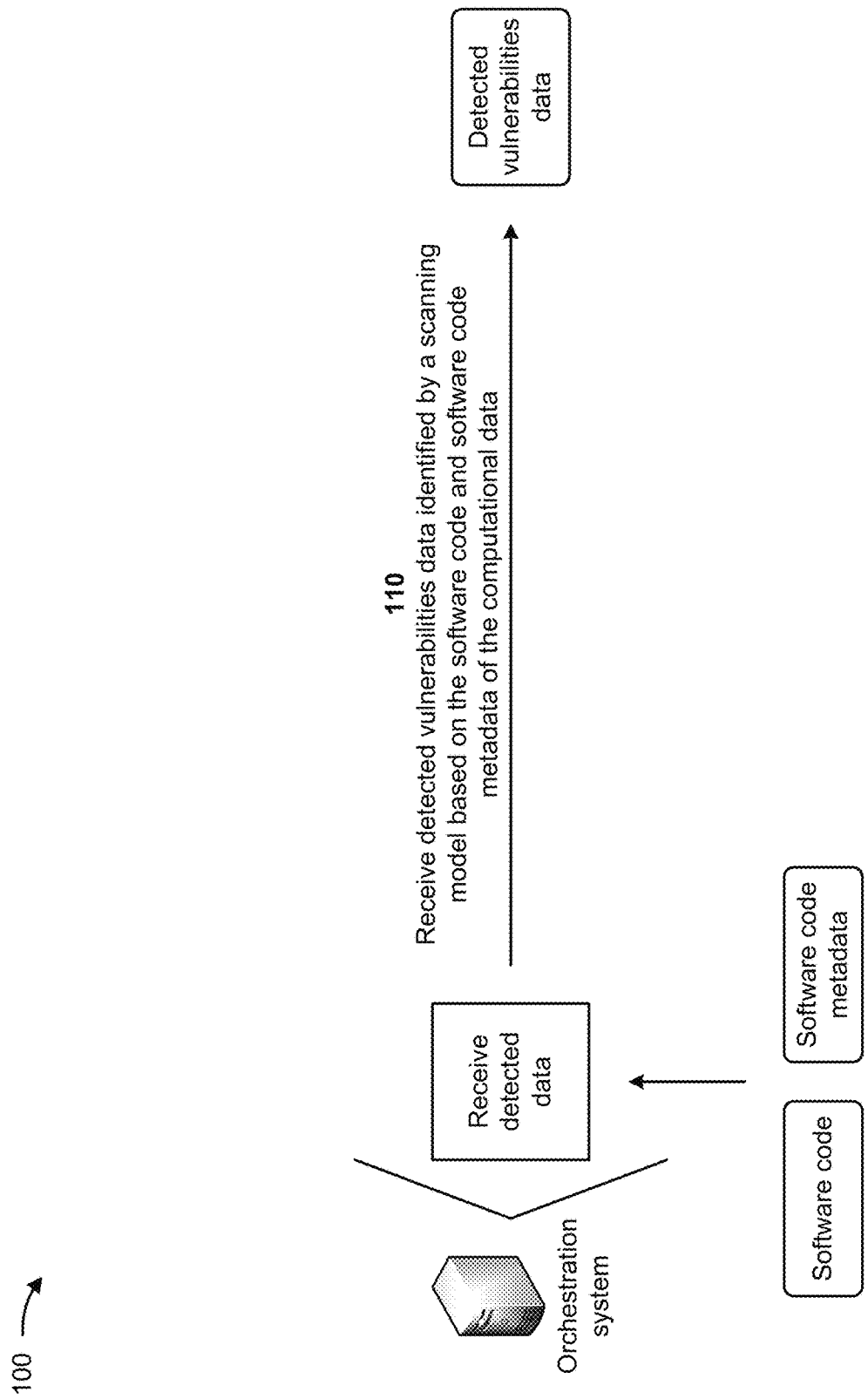

The following detailed description of example implementations refers to the accompanying drawings. The same reference numbers in different drawings may identify the same or similar elements.

In order to make appropriate decisions associated with software security testing, a security analyst requires a tremendous amount of context, such as data related to software code, a history of the software code, real world context of threats to the software code, regulations for the software code, and/or the like. Since a security analyst is unable to remember such context, the security analyst spends an inordinate amount of time looking up the context over and over again. Performing security testing of the software code (e.g., either deployed software code or software code under development) produces large volumes of data that is difficult to navigate and understand in order to improve security of the software code. Furthermore, performing security testing of the software code several times (e.g., to ensure security of the software code) requires the difficult task of obtaining permissions to test the software code. A security analyst may need to manage a large list of software code to be tested, track progress of the tests, determine whether a test is complete, manage resources performing the tests, and/or the like.

This, in turn, wastes computing resources (e.g., processing resources, memory resources, communication resources, and/or the like), human resources, and/or the like associated with losing information caused by a security breach of the software code, discovering the security breach, attempting to recover the lost information, training security analysts to prevent security breaches of the software code, and/or the like.

Some implementations described herein relate to an orchestration system that utilizes orchestration and augmented vulnerability triage for software security testing. For example, the orchestration system may receive contextual data, computational data, experiential data, and industry data associated with software code, and may receive detected vulnerabilities data identified by a scanning model based on the software code and software code metadata of the computational data. The orchestration system may process the contextual data, the computational data, and the experiential data, with a contextual identification model, to determine a set of rules and a set of actions, wherein the set of rules are associated with security testing of the software code. The orchestration system may enrich, via an enrichment model, the industry data with the experiential data to generate enriched industry data, and may process the software code metadata, the detected vulnerabilities data, and the enriched industry data, with a correlation model, to generate analysis data. The orchestration system may process the analysis data and the set of rules, with a security model, to confirm one or more security issues associated with the software code, and may perform one or more actions, from the set of actions, based on the one or more security issues.

In this way, the orchestration system utilizes orchestration and augmented vulnerability triage for software security testing. The orchestration system may confirm security issues associated with software code and may recommend actions to perform in order to address the security issues. The orchestration system may significantly reduce and/or eliminate identification of false positive security issues, may provide a workflow that a security analyst may utilize to address a security issue, may confirm the security issues in near-real time, may train security analysts, and/or the like. This, in turn, conserves computing resources, human resources, and/or the like that would otherwise have been wasted in losing information caused by a security breach of the software code, discovering the security breach, attempting to recover the lost information, training security analysts to prevent security breaches of the software code, and/or the like.

FIGS. 1A-1F are diagrams of an example 100 associated with utilizing orchestration and augmented vulnerability triage for software security testing. As shown in FIGS. 1A-1F, example 100 includes a user device, a server device, and a user (e.g., human input) associated with an orchestration system. The user device may include a laptop computer, a mobile telephone, a desktop computer, and/or the like utilized by a user (e.g., a security analyst). The server device may include a device that collects and/or determines contextual data, computational data, experiential data, and industry data associated with software code. The orchestration system may include a system that utilizes orchestration and augmented vulnerability triage for software security testing.

As shown in FIG. 1A, and by reference number 105, the orchestration system receives contextual data, computational data, experiential data, and industry data associated with software code. In some implementations, the orchestration system receives the contextual data, the computational data, the experiential data, and the industry data from the server device based on a request for such data provided by the orchestration system to the server device. In some implementations, the user device may instruct (e.g., based on instructions received by a user) the server device to provide the contextual data, the computational data, the experiential data, and the industry data to the orchestration system.

The software code may include software code written in various programming languages or frameworks, a package of multiple software code files, a compiled version of the software code, a library of the software code, and/or the like. The contextual data may include source code of the software code, data identifying a creator of the software code, data identifying an infrastructure to which the software code is deployed or is to be deployed. For example, the contextual data may include data identifying the software code in a test folder, where the software code is to be used for testing only and not expected to be used after conclusion of the testing. Vulnerabilities in such code may be considered false positives. In another example, the contextual data may include a list of libraries (e.g., third party libraries) that are used by the software code.

The computational data may include the software code and software code metadata associated with the software code. The software code metadata may include descriptive metadata identifying a title, an abstract, an author, keywords, and/or the like of the software code; structural metadata identifying types, versions, relationships, other characteristics, and/or the like of the software code; administrative metadata identifying permissions, creation, and/or the like of the software code; and/or the like.

The experiential data may include data derived from experiences of a plurality of experts (e.g., security analysts) associated with security testing of the software code. The experiential data may include an aggregation data generated by the experts when the experts are reviewing results of security tests of the software code. For example, the experiential data may include data associated with statements of the experts (e.g., "when the input data is from a trusted source, the vulnerability is usually flagged as false positive," or "I've seen issues with this library before").

The industry data may include industrial vulnerability indexes (e.g., a common weakness enumeration (CWE) index); data identifying laws and regulations (e.g., privacy laws or regulations for maintaining and protecting customer data, and/or the like); threat and vulnerability intelligence data (e.g., intelligence associated with cyberattacks, phishing, computer viruses, computer worms, a Trojan horse, an injection attack, a denial of service (DOS) attack, adware, spyware, man-in-the-middle attacks, and/or the like); infrastructure data (e.g., security provided to protect infrastructure, such as network communications, media, manufacturing facilities, and/or the like); and/or the like.

As shown in FIG. 1B, and by reference number 110, the orchestration system may receive detected vulnerabilities data identified by a scanning model based on the software code and software code metadata of the computational data. In some implementations, the scanning model determines location data identifying locations (e.g., lines of the software code) of vulnerabilities in the software code, and identifies particular software code metadata, of the software code metadata, associated with locations of the location data. The scanning model generates the detected vulnerabilities data based on the location data and the particular software code metadata.

The orchestration system may onboard (e.g., provide) the software code and the software code metadata to the scanning model, and the scanning model may analyze the software code for occurrences of patterns that may lead to unintended and/or unsecure behavior of the software code. For example, when an input is received, the software code may be expected to provide or display an output. The output may be defined in a design and software behavior specification. If the input is not handled properly, a specifically crafted input may cause the software code to provide an unintended output disclosing more information than designed. Such an unintended output may be referred to as a vulnerability.

The detected vulnerabilities data may include a data set describing all the detected vulnerabilities in the software code. For example, the detected vulnerabilities data may include a report in a particular format (e.g., a Microsoft Excel format, Adobe Portable Document Format, a hypertext markup language format, and/or the like). The detected vulnerabilities data may include data identifying the vulnerabilities, locations of the vulnerabilities in the software code (e.g., lines and columns in text of the software code), software code metadata associated with the vulnerabilities, a mapping of the vulnerabilities to an industrial vulnerability index (e.g., the CWE index), and/or the like.

Figure 1C:
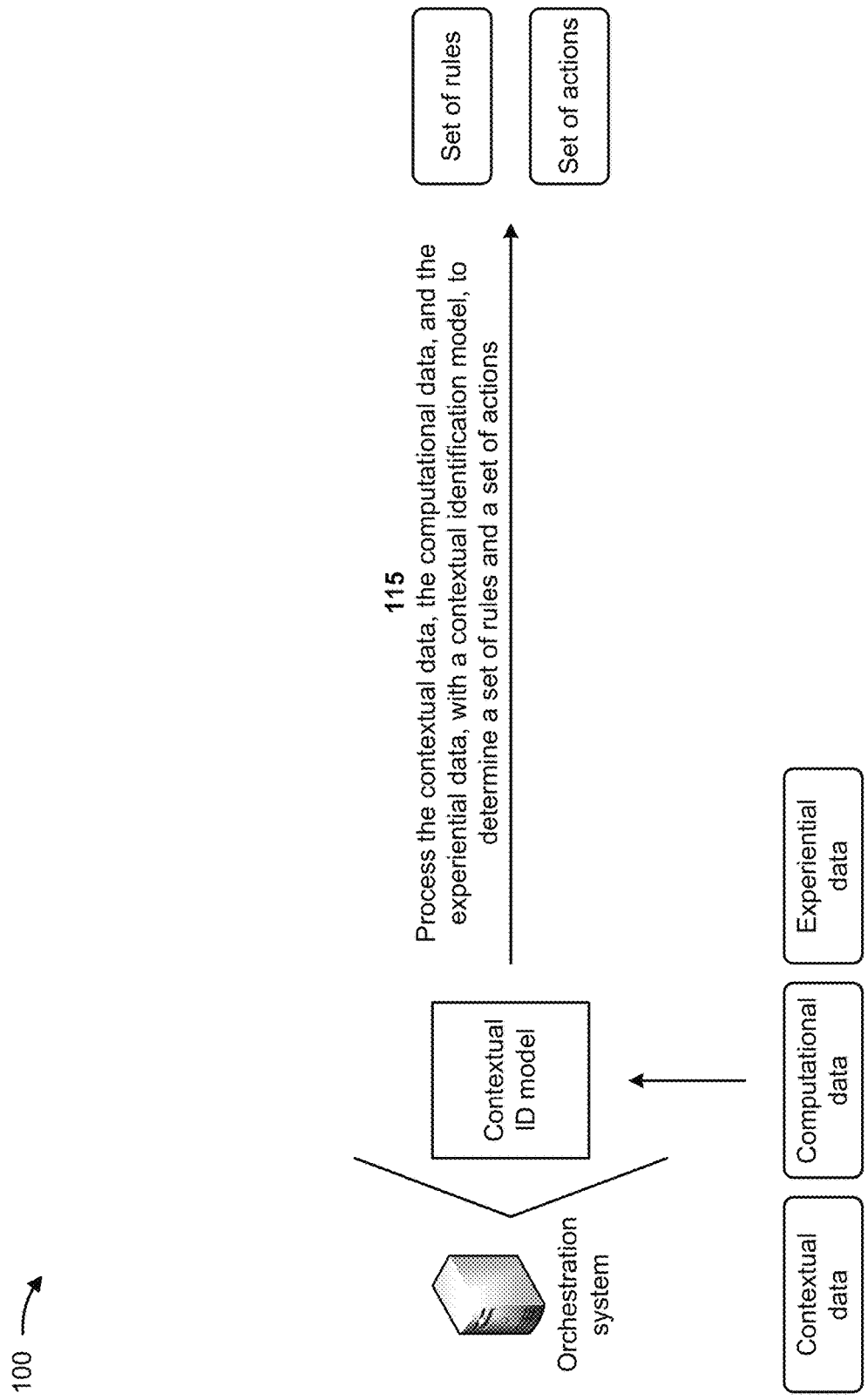

As shown in FIG. 1C, and by reference number 115, the orchestration system may process the contextual data, the computational data, and the experiential data, with a contextual identification model, to determine a set of rules and a set of actions. The contextual identification model may validate the contextual data, the computational data, and the experiential data, with the contextual identification model, to generate validated data. For example, the contextual identification model may generate the validated data based on cross-referencing and identifying conflicting, inconsistent, and/or uncorrelated data in the contextual data, the computational data, and the experiential data. The contextual identification model may remove the conflicting, inconsistent, and/or uncorrelated data from the contextual data, the computational data, and the experiential data.

The contextual identification model may aggregate the contextual data, the computational data, the experiential data, and the validated data to determine candidate rules. For example, the contextual identification model may aggregate validated statements of the validated data with the contextual data, the computational data, and the experiential data to determine candidate rules (e.g., rule statements). The contextual identification model may determine the candidate rules by inference, generalizing or specifying rule statements related to a same vulnerability type, and/or the like.

The contextual identification model may encode the candidate rules to generate encoded candidate rules. For example, the contextual identification model may encode the candidate rules to generate the encoded candidate rules in the form of decision trees that include rules as nodes and actions, in response to the rules, as connectors between the nodes. The encoded candidate rules may be structured for consumption by computing devices and/or humans.

The contextual identification model may enhance the encoded candidate rules to identify and remove inconsistent candidate rules from the encoded candidate rules and to generate a set of candidate rules. For example, the contextual identification model may test the contextual data, the computational data, and/or the experiential data with the encoded candidate rules to identify the inconsistent (e.g., defective) candidate rules in the encoded candidate rules. The contextual identification model may then remove the inconsistent candidate rules from the encoded candidate rules to generate the set of candidate rules.

The contextual identification model may evaluate the set of candidate rules to select the set of rules from the set of candidate rules. For example, the contextual identification model may compare security analyst data (e.g., monitored and recorded reactions of security analysts) and the set of candidate rules to evaluate the set of candidate rules. The contextual identification model may calculate confidence scores for the candidate rules of the set of candidate rules, and may select particular candidate rules that satisfy a threshold score. The particular candidate rules may form the set of rules. In some implementations, the contextual identification model automatically infers new rules for the set of rules or enhances the particular candidate rules.

The contextual identification model may determine the set of actions based on the set of rules. For example, the contextual identification model may determine one or more actions to automatically perform (e.g., in near-real time relative to receipt of the contextual data, the computational data, and the experiential data) for each of the rules in the set of rules. Each of the one or more actions may include an action or a recommendation to perform an action that minimizes and/or prevents security issues associated with the software code.

Figure 1D:
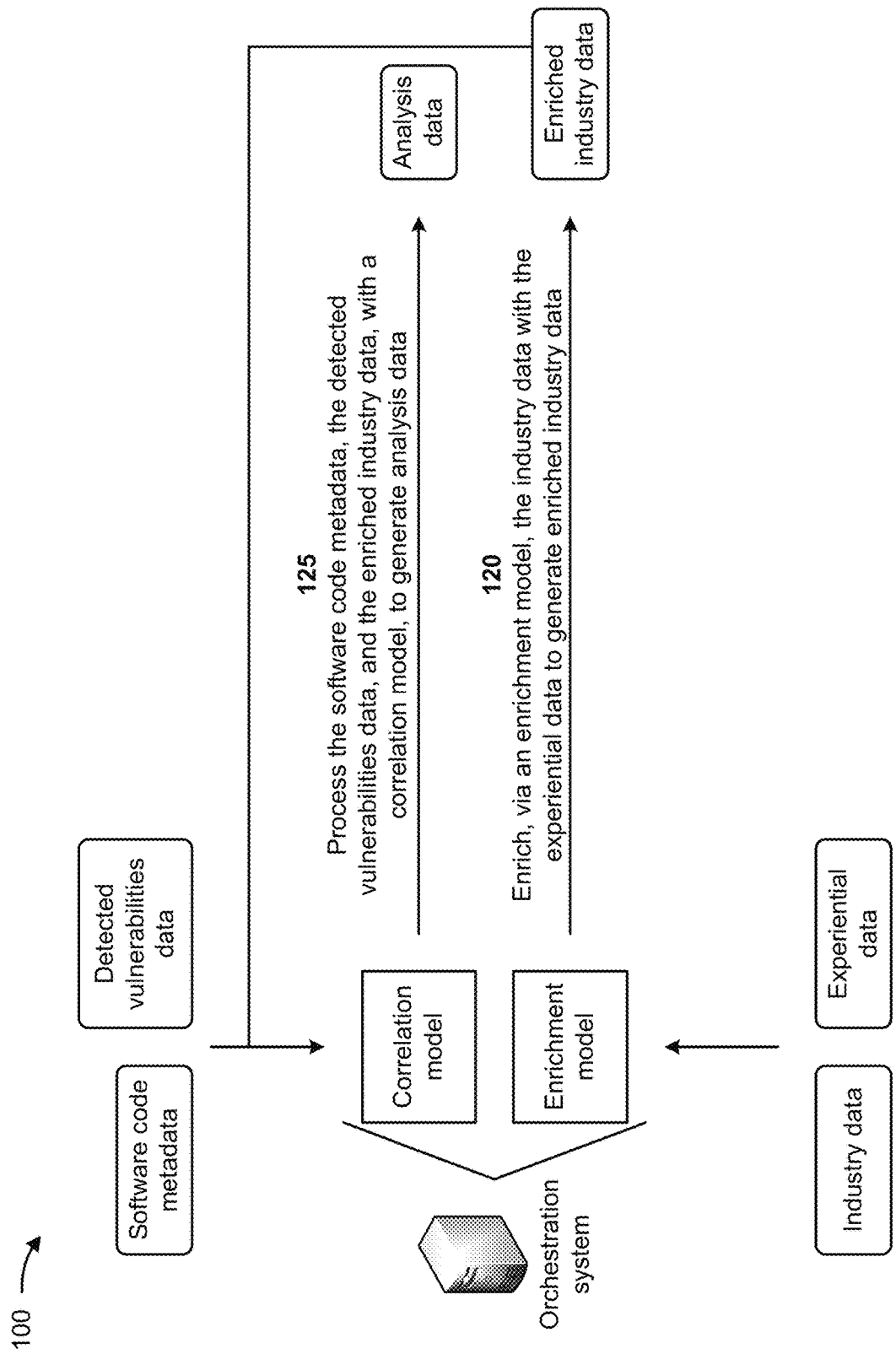

As shown in FIG. 1D, and by reference number 120, the orchestration system may enrich, via an enrichment model, the industry data with the experiential data to generate enriched industry data. For example, the enrichment model may map the industrial vulnerability indexes of the industry data with the experiential data to generate index data. The index data may include data identifying actions (e.g., recommended by the experts that generate the experiential data) to the vulnerabilities of the industrial vulnerability indexes.

The enrichment model may map data identifying the laws and the regulations, of the industry data, with the experiential data to generate security controls data. The security controls data may include data identifying actions (e.g., recommended by the experts that generate the experiential data) to the laws and the regulations.

The enrichment model may map threat and vulnerability intelligence data, of the industry data, with the experiential data to generate security intelligence data. The security intelligence data may include data identifying actions (e.g., recommended by the experts that generate the experiential data) to the threats and vulnerabilities of the threat and vulnerability intelligence data.

The enrichment model may map the infrastructure data, of the industry data, with the experiential data to generate enriched infrastructure data. The enriched infrastructure data may include data identifying actions (e.g., recommended by the experts that generate the experiential data) to the network communications, media, manufacturing facilities, and/or the like of the infrastructure data.

The enrichment model may combine the index data, the security controls data, the security intelligence data, and the enriched infrastructure data to generate the enriched industry data. For example, the enrichment model may correlate the index data, the security controls data, the security intelligence data, and the enriched infrastructure data to generate the enriched industry data, and may store the enriched industry data in a data structure (e.g., a database, a table, a list, and/or the like) associated with the orchestration system.

As further shown in FIG. 1D, and by reference number 125, the orchestration system may process the software code metadata, the detected vulnerabilities data, and the enriched industry data, with a correlation model, to generate analysis data. For example, the correlation model may compare the software code metadata, the detected vulnerabilities data, and the enriched industry data to determine similarities and differences between the software code metadata, the detected vulnerabilities data, and the enriched industry data. The correlation model may correlate the software code metadata, the detected vulnerabilities data, and the enriched industry data to generate the analysis data based on the similarities and the differences between the software code metadata, the detected vulnerabilities data, and the enriched industry data.

In some implementations, the correlation model compares, maps, and/or correlates the enriched industry data with the software code metadata and the detected vulnerabilities data to generate the analysis data. The analysis data may include indexes and mappings between the software code metadata, the detected vulnerabilities data, and the enriched industry data in order to enrich the software code metadata and the detected vulnerabilities data. The analysis data may enable the orchestration system to more accurately confirm security issues in the software code and to more efficiently determine actions to remove the security issues in the software code.

In some implementations, the orchestration system may establish a feedback loop for the analysis data (e.g., to receive feedback associated with the analysis data), and may utilize the feedback to determine one or more new rules for evaluating the software code, one or more new actions to remove security issues from the software code, and/or the like. In this way, the orchestration system may improve automation of the orchestration system and may generate improved results.

Figure 1E:
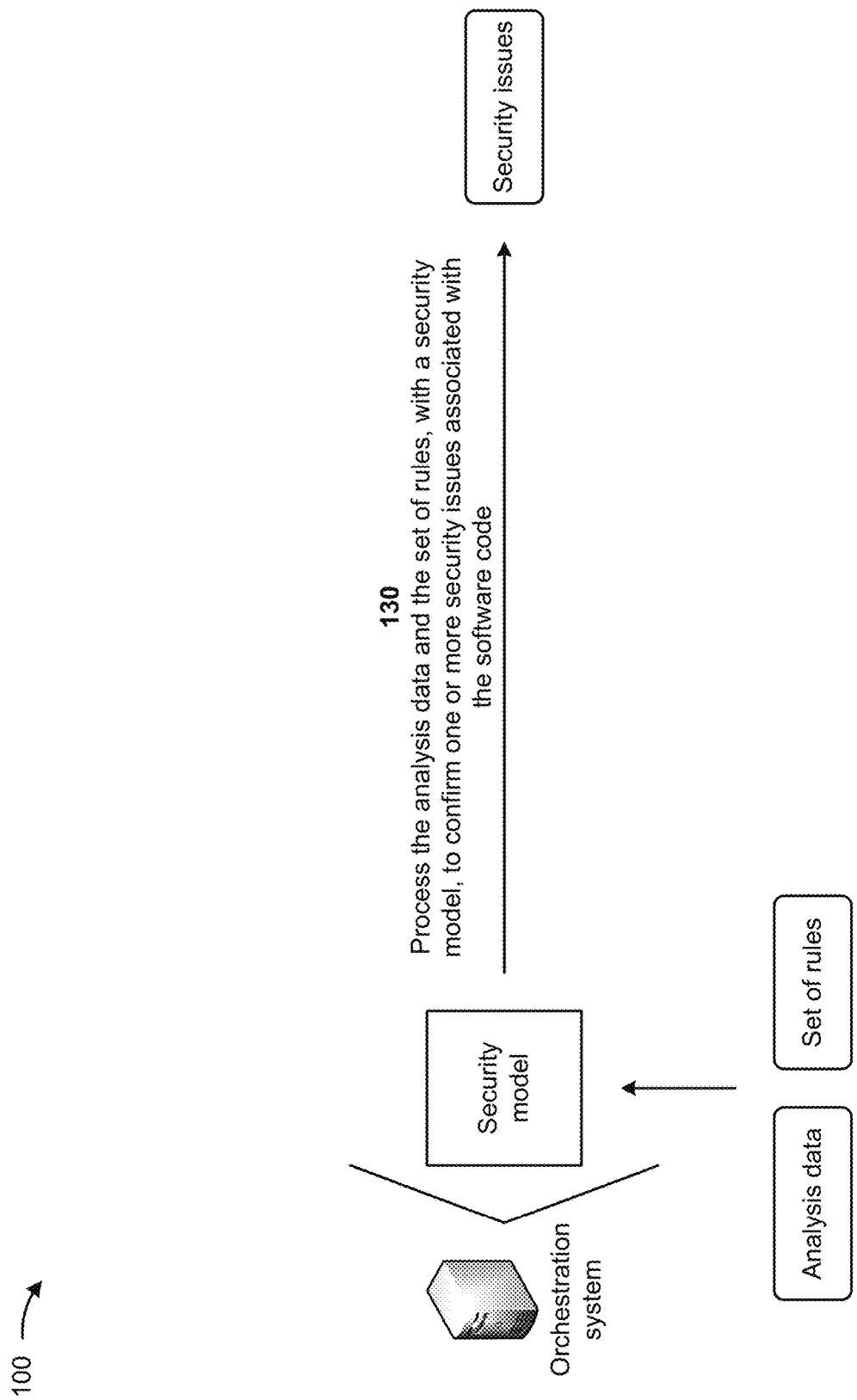

As shown in FIG. 1E, and by reference number 130, the orchestration system may process the analysis data and the set of rules, with a security model, to confirm one or more security issues associated with the software code. For example, the security model may determine whether the analysis data matches one or more rules of the set of rules, and may confirm the one or more security issues associated with the software code based on determining whether the analysis data matches the one or more rules of the set of rules. Each of the one or more security issues, identified in the analysis data, may match one or more rules of the set of rules. The one or more security issues may include one or more portions of the software code that are susceptible to cyberattacks, phishing, computer viruses, computer worms, a Trojan horse, an injection attack, a DOS attack, adware, spyware, man-in-the-middle attacks, and/or the like.

As shown in FIG. 1F, and by reference number 135, the orchestration system may perform an action, from the set of actions, based on the one or more security issues. In some implementations, the action includes the orchestration system generating a user interface that includes data confirming the one or more security issues, and providing the user interface for display to a user (e.g., a security analyst) of the user device. For example, the user interface may include data identifying portions of the software code that are susceptible to the one or more security issues. In this way, the security analyst may utilize the user device to quickly and easily confirm and correct the one or more security issues in the software code.

In some implementations, the action includes the orchestration system determining a correction to the one or more security issues and causing the correction to be implemented in the software code. For example, the orchestration system may automatically modify and/or automatically generate advice about portions of the software code that are susceptible to the one or more security issues, or may instruct the server device to modify the portions of the software code that are susceptible to the one or more security issues. In this way, the orchestration system conserves computing resources, networking resources, and/or the like that would otherwise have been wasted in losing information or productivity caused by the one or more security issues.

In some implementations, the action includes the orchestration system determining a correction to the one or more security issues and providing data identifying the correction for display. For example, the orchestration system may automatically determine modifications to portions of the software code that are susceptible to the one or more security issues, and may provide data identifying the modifications for display to the user device (e.g., the security analyst). In this way, the security analyst may utilize the user device to quickly and easily confirm and correct the one or more security issues in the software code.

In some implementations, the action includes the orchestration system receiving feedback based on the one or more security issues, and causing a correction to the one or more security issues to be implemented in the software code based on the feedback. For example, the orchestration system may receive the feedback from the security analyst via the user device, and may automatically modify and/or automatically generate advice about portions of the software code that are susceptible to the one or more security issues based on the feedback. In this way, the orchestration system conserves computing resources, networking resources, and/or the like that would otherwise have been wasted in losing information or productivity caused by the one or more security issues.

In some implementations, the action includes the orchestration system identifying a false positive security issue in the one or more security issues, and removing the false positive security issue from consideration. For example, the orchestration system may remove the false positive security issue from the one or more security issues. In this way, the orchestration system conserves computing resources, networking resources, and/or the like that would otherwise have been wasted in further processing the false positive security issue.

In some implementations, the action includes the orchestration system retraining the contextual identification model, the enrichment model, the contextual model, and/or the security model based on the one or more security issues. The orchestration system may utilize the one or more security issues as additional training data for retraining the contextual identification model, the enrichment model, the contextual model, and/or the security model, thereby increasing the quantity of training data available for training the contextual identification model, the enrichment model, the contextual model, and/or the security model. Accordingly, the orchestration system may conserve computing resources associated with identifying, obtaining, and/or generating historical data for training the contextual identification model, the enrichment model, the contextual model, and/or the security model relative to other systems for identifying, obtaining, and/or generating historical data for training machine learning models.

In some implementations, the orchestration system includes a triage component providing a user interface that includes the data described herein. The triage component may enable a security analyst to focus on security outliers, development of new rules, review of metrics, review of efficiency of existing rules, and/or the like. The triage component may streamline an experience of the security analyst, may minimize switching context between various systems, and/or the like. For example, a detected vulnerability of the software code may require a detailed review of the software code in an integrated development environment, a search through code libraries, reference to a knowledgebase, consultation with colleagues, utilization of various other tools, and/or the like, and the triage component may streamline such activities.

In some implementations, the orchestration system continuously receives and records activities associated with the orchestration system, and utilizes the recorded activities to determine decisions, to infer new rules based on the decisions, to identify data sets most relevant for the decisions, and/or the like. The decisions may include insights on false positives, various programming languages and frameworks, remedial actions on vulnerabilities, and/or the like. The orchestration system may utilize the insights with software development tools (e.g., an integrated development environment) to suggest secure code language to a software developer or identify security issues in the developed code.

In this way, the orchestration system utilizes orchestration and augmented vulnerability triage for software security testing. The orchestration system may confirm security issues associated with software code and may recommend actions to perform in order to address the security issues. The orchestration system may significantly reduce and/or eliminate identification of false positive security issues, may provide a workflow that a security analyst may utilize to address a security issue, may confirm the security issues in near-real time, may train security analysts, and/or the like. The orchestration system may provide automated processes that enhance a security analyst decision making process, and may provide thorough data capture, automatic decisions, and/or the like to further create new or enhance existing decision making models and further enrich existing datasets. This, in turn, conserves computing resources, networking resources, and/or the like that would otherwise have been wasted in losing information caused by a security breach of the software code, discovering the security breach, attempting to recover the lost information, training security analysts to prevent security breaches of the software code, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
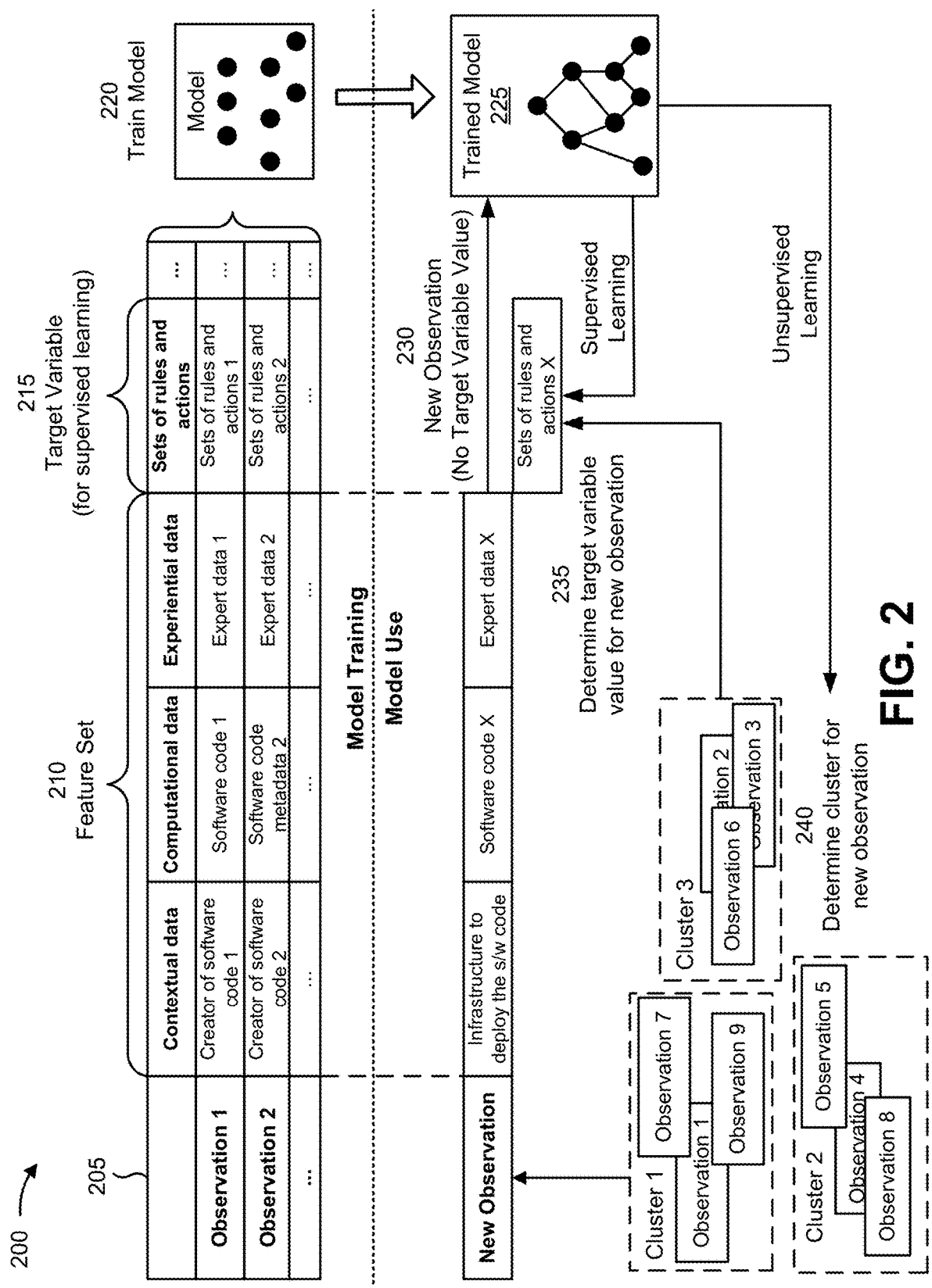
FIG. 2 is a diagram illustrating an example of training and using a machine learning model in connection with orchestrating and performing augmented vulnerability triage for software security testing.

FIG. 2 is a diagram illustrating an example 200 of training and using a machine learning model (e.g., the scanning model, the contextual identification model, the enrichment model, the contextual model, or the security model) in connection with orchestrating and performing augmented vulnerability triage for software security testing. The machine learning model training and usage described herein may be performed using a machine learning system. The machine learning system may include or may be included in a computing device, a server, a cloud computing environment, and/or the like, such as the orchestration system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the orchestration system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the orchestration system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of contextual data, a second feature of computational data, a third feature of experiential data, and so on. As shown, for a first observation, the first feature may have a value of creator of software code 1, the second feature may have a value of software code 1, the third feature may have a value of expert data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is sets of rules and actions, which has a value of sets of rules and actions 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of an infrastructure to deploy software code X, a second feature of software code X, a third feature of expert data X, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of sets of rules and actions X for the target variable of workflow for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a experiential data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a computational data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to perform orchestration and augmented vulnerability triage for software security testing. The machine learning system enables recognition and/or identification of tens, hundreds, thousands, or millions of features and/or feature values for tens, hundreds, thousands, or millions of observations, thereby increasing accuracy and consistency and reducing delay associated with performing orchestration and augmented vulnerability triage for software security testing relative to requiring computing resources to be allocated for tens, hundreds, or thousands of operators to manually perform orchestration and augmented vulnerability triage for software security testing.

As indicated above, FIG. 2 is provided as an example. Other examples may differ from what is described in connection with FIG. 2.

Figure 3:
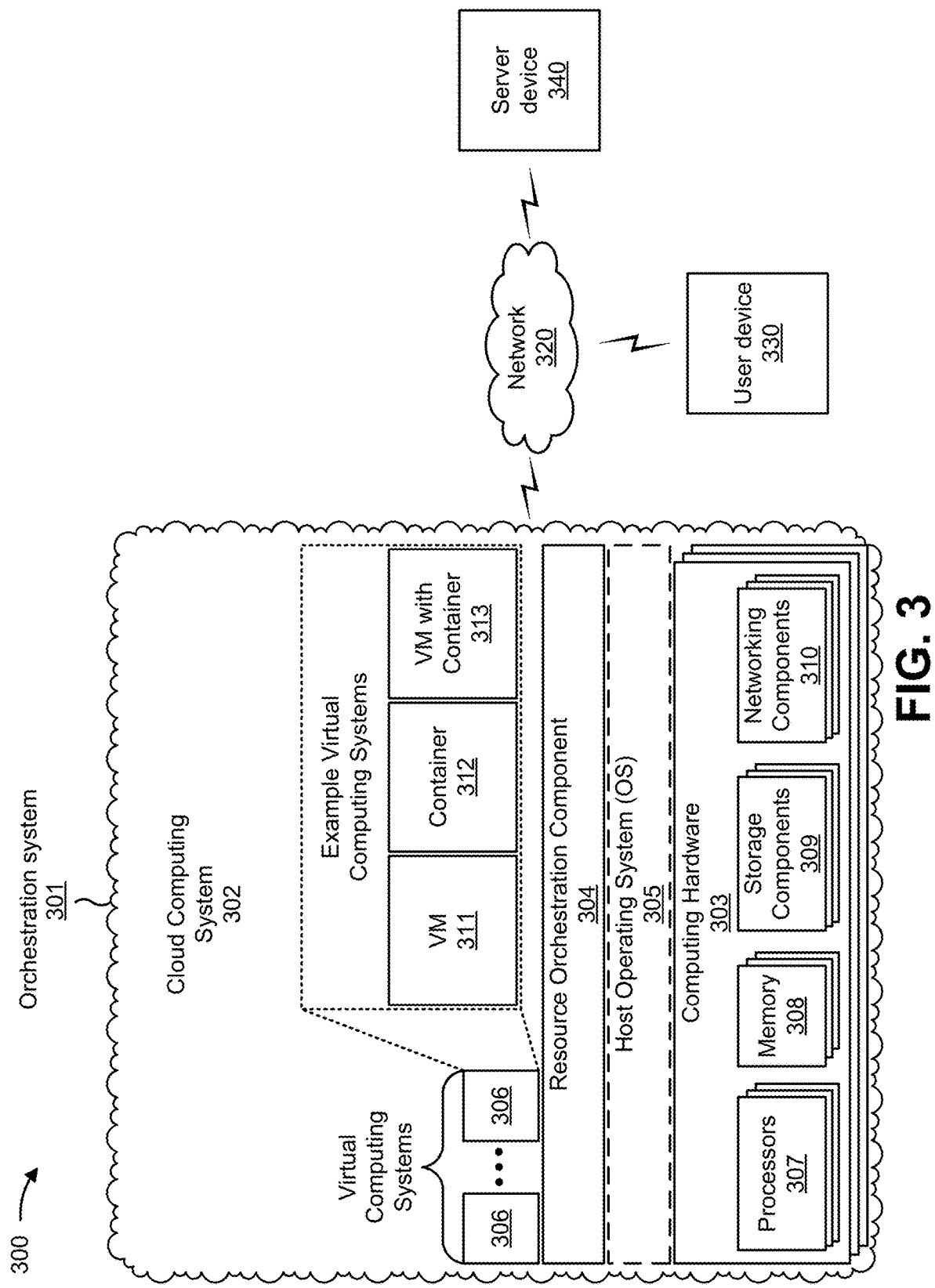
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an orchestration system 301, which may include one or more elements of and/or may execute within a cloud computing system 302. The cloud computing system 302 may include one or more elements 303-313, as described in more detail below. As further shown in FIG. 3, environment 300 may include a network 320, a user device 330, and/or a server device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the orchestration system 301 may include one or more elements 303-313 of the cloud computing system 302, may execute within the cloud computing system 302, and/or may be hosted within the cloud computing system 302, in some implementations, the orchestration system 301 may not be cloud-based (e.g., may be implemented outside of a cloud computing system) or may be partially cloud-based. For example, the orchestration system 301 may include one or more devices that are not part of the cloud computing system 302, such as device 400 of FIG. 4, which may include a standalone server or another type of computing device. The orchestration system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

Server device 340 includes one or more devices capable of receiving, generating, storing, processing, providing, and/or routing information, as described elsewhere herein. Server device 340 may include a communication device and/or a computing device. For example, server device 340 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Server device 340 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

FIG. 4 is a diagram of example components of a device 400, which may correspond to orchestration system 301, user device 330, and/or server device 340. In some implementations, orchestration system 301, user device 330, and/or server device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for utilizing orchestration and augmented vulnerability triage for software security testing. In some implementations, one or more process blocks of FIG. 5 may be performed by a device (e.g., orchestration system 301). In some implementations, one or more process blocks of FIG. 5 may be performed by another device or a group of devices separate from or including the device, such as a user device (e.g., user device 330) and/or a server device (e.g., server device 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving contextual data, computational data, experiential data, and industry data associated with software code (block 510). For example, the device may receive contextual data, computational data, experiential data, and industry data associated with software code, as described above.

As further shown in FIG. 5, process 500 may include receiving detected vulnerabilities data identified by a scanning model based on the software code and software code metadata of the computational data (block 520). For example, the device may receive detected vulnerabilities data identified by a scanning model based on the software code and software code metadata of the computational data, as described above.

As further shown in FIG. 5, process 500 may include processing the contextual data, the computational data, and the experiential data, with a contextual identification model, to determine a set of rules and a set of actions, wherein the set of rules are associated with security testing of the software code (block 530). For example, the device may process the contextual data, the computational data, and the experiential data, with a contextual identification model, to determine a set of rules and a set of actions, as described above. In some implementations, the set of rules are associated with security testing of the software code.

As further shown in FIG. 5, process 500 may include enriching, via an enrichment model, the industry data with the experiential data to generate enriched industry data (block 540). For example, the device may enrich, via an enrichment model, the industry data with the experiential data to generate enriched industry data, as described above.

As further shown in FIG. 5, process 500 may include processing the software code metadata, the detected vulnerabilities data, and the enriched industry data, with a correlation model, to generate analysis data (block 550). For example, the device may process the software code metadata, the detected vulnerabilities data, and the enriched industry data, with a correlation model, to generate analysis data, as described above.

As further shown in FIG. 5, process 500 may include processing the analysis data and the set of rules, with a security model, to confirm one or more security issues associated with the software code (block 560). For example, the device may process the analysis data and the set of rules, with a security model, to confirm one or more security issues associated with the software code, as described above.

As further shown in FIG. 5, process 500 may include performing one or more actions, from the set of actions, based on the one or more security issues (block 570). For example, the device may perform one or more actions, from the set of actions, based on the one or more security issues, as described above.

Process 500 may include additional implementations, such as any single implementation or any combination of implementations described below and/or in connection with one or more other processes described elsewhere herein.

In a first implementation, receiving the detected vulnerabilities data identified by the scanning model based on the software code and the software code metadata of the computational data includes receiving the detected vulnerabilities data identified by the scanning model based on location data identifying locations of the vulnerabilities in the software code and particular software code metadata, of the software code metadata, associated with the location data.

In a second implementation, alone or in combination with the first implementation, processing the contextual data, the computational data, and the experiential data, with the contextual identification model, to determine the set of rules and the set of actions includes validating the contextual data, the computational data, and the experiential data, with the contextual identification model to generate validated data; aggregating the contextual data, the computational data, the experiential data, and the validated data to determine candidate rules; encoding the candidate rules to generate encoded candidate rules; enhancing the encoded candidate rules to identify and remove inconsistent candidate rules from the encoded candidate rules and to generate a set of candidate rules; evaluating the set of candidate rules to select the set of rules from the set of candidate rules, and determining the set of actions based on the set of rules.

In a third implementation, alone or in combination with one or more of the first and second implementations, enriching, via the enrichment model, the industry data with the experiential data to generate the enriched industry data includes mapping industrial vulnerability indexes of the industry data with the experiential data to generate index data; mapping data identifying laws and regulations with the experiential data to generate security controls data; mapping threat and vulnerability intelligence data with the experiential data to generate security intelligence data; mapping infrastructure data with the experiential data to generate enriched infrastructure data; and combining the index data, the security controls data, the security intelligence data, and the enriched infrastructure data to generate the enriched industry data.

In a fourth implementation, alone or in combination with one or more of the first through third implementations, processing the software code metadata, the detected vulnerabilities data, and the enriched industry data, with the correlation model, to generate the analysis data includes comparing the software code metadata, the detected vulnerabilities data, and the enriched industry data to determine similarities and differences between the software code metadata, the detected vulnerabilities data, and the enriched industry data; and correlating the software code metadata, the detected vulnerabilities data, and the enriched industry data to generate the analysis data based on the similarities and the differences between the software code metadata, the detected vulnerabilities data, and the enriched industry data.

In a fifth implementation, alone or in combination with one or more of the first through fourth implementations, processing the analysis data and the set of rules, with the security model, to confirm the one or more security issues associated with the software code includes determining whether the analysis data matches one or more rules of the set of rules, and confirming the one or more security issues associated with the software code based on determining whether the analysis data matches the one or more rules of the set of rules.

In a sixth implementation, alone or in combination with one or more of the first through fifth implementations, performing the one or more actions based on the one or more security issues includes generating a user interface that includes data confirming the one or more security issues, and providing the user interface for display.

In a seventh implementation, alone or in combination with one or more of the first through sixth implementations, performing the one or more actions based on the one or more security issues includes determining a correction to one of the one or more security issues, and causing the correction to be implemented in the software code.

In an eighth implementation, alone or in combination with one or more of the first through seventh implementations, performing the one or more actions based on the one or more security issues includes determining a correction to one of the one or more security issues, generating a user interface that includes data identifying the correction, and providing the user interface for display.

In a ninth implementation, alone or in combination with one or more of the first through eighth implementations, performing the one or more actions based on the one or more security issues includes generating a user interface that includes data confirming the one or more security issues; providing the user interface for display; receiving feedback based on the one or more security issues via the user interface; determining a correction to the one or more security issues based on the feedback; and causing the correction to be implemented in the software code.

In a tenth implementation, alone or in combination with one or more of the first through ninth implementations, performing the one or more actions based on the one or more security issues includes identifying a false positive security issue in the one or more security issues and removing the false positive security issue from consideration; or retraining one or more of the scanning model, the contextual identification model, the enrichment model, the contextual model, or the security model based on the one or more security issues.

In an eleventh implementation, alone or in combination with one or more of the first through tenth implementations, the contextual data includes one or more of the software code or data identifying an infrastructure to which the software code is to be deployed.

In a twelfth implementation, alone or in combination with one or more of the first through eleventh implementations, the experiential data includes data provided by a one or more experts associated with security testing of the software code.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, contextual data, computational data, experiential data, and industry data associated with software code;
receiving, by the device, detected vulnerabilities data identified by a scanning model based on the software code and software code metadata of the computational data;
validating, by the device, the contextual data, the computational data, and the experiential data, with a machine learning model, to generate validated data;
aggregating the contextual data, the computational data, the experiential data, and the validated data to determine candidate rules;
enhancing the candidate rules to remove inconsistent candidate rules from the candidate rules and to generate a set of candidate rules;
determining a set of actions based on a set of rules selected from the set of candidate rules,
wherein the set of rules are associated with security testing of the software code;
enriching, by the device and via an enrichment model, the industry data with the experiential data to generate enriched industry data;
processing, by the device, the software code metadata, the detected vulnerabilities data, and the enriched industry data, with a correlation model, to generate analysis data;
processing, by the device, the analysis data and the set of rules, with a security model, to confirm one or more security issues associated with the software code; and
performing, by the device, one or more actions, from the set of actions, based on the one or more security issues.

2. The method of claim 1, wherein receiving the detected vulnerabilities data identified by the scanning model based on the software code and the software code metadata of the computational data comprises:
receiving the detected vulnerabilities data identified by the scanning model based on location data identifying locations of the vulnerabilities in the software code and particular software code metadata, of the software code metadata, associated with the location data.

3. The method of claim 1, wherein enriching, via the enrichment model, the industry data with the experiential data to generate the enriched industry data comprises:
mapping industrial vulnerability indexes of the industry data with the experiential data to generate index data;
mapping data identifying laws and regulations with the experiential data to generate security controls data;
mapping threat and vulnerability intelligence data with the experiential data to generate security intelligence data;
mapping infrastructure data with the experiential data to generate enriched infrastructure data; and
combining the index data, the security controls data, the security intelligence data, and the enriched infrastructure data to generate the enriched industry data.

4. The method of claim 1, wherein processing the software code metadata, the detected vulnerabilities data, and the enriched industry data, with the correlation model, to generate the analysis data comprises:
comparing the software code metadata, the detected vulnerabilities data, and the enriched industry data to determine similarities and differences between the software code metadata, the detected vulnerabilities data, and the enriched industry data; and
correlating the software code metadata, the detected vulnerabilities data, and the enriched industry data to generate the analysis data based on the similarities and the differences between the software code metadata, the detected vulnerabilities data, and the enriched industry data.

5. The method of claim 1, wherein processing the analysis data and the set of rules, with the security model, to confirm the one or more security issues associated with the software code comprises:
determining whether the analysis data matches one or more rules of the set of rules; and
confirming the one or more security issues associated with the software code based on determining whether the analysis data matches the one or more rules of the set of rules.

6. The method of claim 1, wherein performing the one or more actions based on the one or more security issues comprises:
generating a user interface that includes data confirming the one or more security issues; and
providing the user interface for display.

7. A device, comprising:
one or more memories; and
one or more processors, communicatively coupled to the one or more memories, configured to:
receive contextual data, computational data, experiential data, and industry data associated with software code,
wherein the industry data includes one or more of:
industrial vulnerability indexes,
data identifying laws and regulations,
threat and vulnerability intelligence data, or
infrastructure data;
receive detected vulnerabilities data identified by a scanning model based on the software code and software code metadata of the computational data;
validate the contextual data, the computational data, and the experiential data, with a machine learning model, to generate validated data;
aggregate the contextual data, the computational data, the experiential data, and the validated data to determine candidate rules;
enhance the candidate rules to remove inconsistent candidate rules from the candidate rules and to generate a set of candidate rules;
determine a set of actions based on a set of rules selected from the set of candidate rules,
wherein the set of rules are associated with security testing of the software code;
enrich, via an enrichment model, the industry data with the experiential data to generate enriched industry data;
process the software code metadata, the detected vulnerabilities data, and the enriched industry data, with a correlation model, to generate analysis data;
process the analysis data and the set of rules, with a security model, to confirm one or more security issues associated with the software code; and
perform one or more actions, from the set of actions, based on the one or more security issues.

8. The device of claim 7, wherein the one or more processors, when performing the one or more actions based on the one or more security issues, are configured to:
determine a correction to one of the one or more security issues; and cause the correction to be implemented in the software code.

9. The device of claim 7, wherein the one or more processors, when performing the one or more actions based on the one or more security issues, are configured to:
determine a correction to one of the one or more security issues;
generate a user interface that includes data identifying the correction; and
provide the user interface for display.

10. The device of claim 7, wherein the one or more processors, when performing the one or more actions based on the one or more security issues, are configured to:
generate a user interface that includes data confirming the one or more security issues;
provide the user interface for display;
receive feedback based on the one or more security issues via the user interface;
determine a correction to the one or more security issues based on the feedback; and
cause the correction to be implemented in the software code.

11. The device of claim 7, wherein the one or more processors, when performing the one or more actions based on the one or more security issues, are configured to:
identify a false positive security issue in the one or more security issues and remove the false positive security issue from consideration, or
retrain one or more of the scanning model, the machine learning model, the enrichment model, the correlation model, or the security model based on the one or more security issues.

12. The device of claim 7, wherein the contextual data includes one or more of:
the software code, or
the infrastructure data to which the software code is to be deployed.

13. The device of claim 7, wherein the experiential data includes data provided by one or more experts associated with security testing of the software code.

14. A non-transitory computer-readable medium storing a set of instructions, the set of instructions comprising:
one or more instructions that, when executed by one or more processors of a device, cause the device to:
receive contextual data, computational data, experiential data, and industry data associated with software code,
wherein the contextual data includes one or more of:
the software code, or
data identifying an infrastructure to which the software code is to be deployed,
wherein the experiential data includes data provided by a plurality of experts associated with security testing of the software code;
receive detected vulnerabilities data identified by a scanning model based on the software code and software code metadata of the computational data;
validate the contextual data, the computational data, and the experiential data, with a machine learning model, to generate validated data;
aggregate the contextual data, the computational data, the experiential data, and the validated data to determine candidate rules;
enhance the candidate rules to remove inconsistent candidate rules from the candidate rules and to generate a set of candidate rules;
determine a set of actions based on a set of rules selected from the set of candidate rules,
wherein the set of rules are associated with security testing of the software code;
enrich, via an enrichment model, the industry data with the experiential data to generate enriched industry data;
process the software code metadata, the detected vulnerabilities data, and the enriched industry data, with a correlation model, to generate analysis data;
process the analysis data and the set of rules, with a security model, to confirm one or more security issues associated with the software code; and
perform one or more actions, from the set of actions, based on the one or more security issues.

15. The non-transitory computer-readable medium of claim 14, wherein the one or more instructions, that cause the device to process the software code and the software code metadata, with the scanning model, to identify the detected vulnerabilities data, cause the device to:
receive the detected vulnerabilities data identified by the scanning model based on location data identifying locations of the vulnerabilities in the software code and particular software code metadata, of the software code metadata, associated with the location data.

16. The non-transitory computer-readable medium of claim 14, wherein the one or more instructions, that cause the device to enrich, via the enrichment model, the industry data with the experiential data to generate the enriched industry data, cause the device to:
map industrial vulnerability indexes of the industry data with the experiential data to generate index data;
map data identifying laws and regulations with the experiential data to generate security controls data;
map threat and vulnerability intelligence data with the experiential data to generate security intelligence data;
map infrastructure data with the experiential data to generate enriched infrastructure data; and
combine the index data, the security controls data, the security intelligence data, and the enriched infrastructure data to generate the enriched industry data.

17. The non-transitory computer-readable medium of claim 14, wherein the one or more instructions, that cause the device to process the software code metadata, the detected vulnerabilities data, and the enriched industry data, with the correlation model, to generate the analysis data, cause the device to:
compare the software code metadata, the detected vulnerabilities data, and the enriched industry data to determine similarities and differences between the software code metadata, the detected vulnerabilities data, and the enriched industry data; and
correlate the software code metadata, the detected vulnerabilities data, and the enriched industry data to generate the analysis data based on the similarities and the differences between the software code metadata, the detected vulnerabilities data, and the enriched industry data.

18. The non-transitory computer-readable medium of claim 14, wherein the one or more instructions, that cause the device to process the analysis data and the set of rules, with the security model, to confirm the one or more security issues associated with the software code, cause the device to:
determine whether the analysis data matches one or more rules of the set of rules; and confirm the one or more security issues associated with the software code based on determining whether the analysis data matches the one or more rules of the set of rules.

19. The method of claim 1, wherein the candidate rules are first candidate rules, and the method further comprising:

determining, based on the machine learning model, confidence scores for second candidate rules of the set of candidate rules, wherein the set of rules are selected from the set of candidate rules based on selecting particular candidate rules of the set of candidate rules that satisfy a threshold confidence score.

20. The device of claim 7, wherein the candidate rules are first candidate rules, and wherein the one or more processors are configured to:

determine, based on the machine learning model, confidence scores for second candidate rules of the set of candidate rules, wherein the set of rules are selected from the set of candidate rules based on selecting particular candidate rules of the set of candidate rules that satisfy a threshold confidence score.

\* \* \* \* \*